3,046,185
SLIME CONTROL AGENTS AND DISINFECTANTS IN PAPER MILL WHITE WATER
Joseph E. Buonanno, Providence, and James C. Shore, Edgewood, R.I., assignors to Metro Atlantic, Inc., Centerdale, R.I., a corporation of Rhode Island
No Drawing. Filed June 30, 1958, Ser. No. 745,244
2 Claims. (Cl. 162—161)

The present invention relates to slime control agents and disinfectants in paper mill white water.

It has been found that in paper mill white water, there is a continual formation of slime resulting from bacterial growth particularly where there is an enclosed water circulation system.

Where, in many instances, from eighty to one hundred parts of water must be circulated for each part of paper pulp, it is quite difficult effectively to treat this amount of water to eliminate the slime without also affecting the paper making efficiency and the quality of the paper produced.

Furthermore, the development of slime resulting from bacterial growth also greatly militates against a most effective paper production process.

The slime which is formed and the bacterial growth which gives rise thereto appear to be most resistant as regards many bactericidal agents and as the water is circulated in the paper pulp processing, the bacteria appears to acquire a resistance to bactericidal agents.

For example, the most effective bactericidal agents in the form of mercury compounds such as phenylmercuric acetate are very expensive and because of increasing resistance of the bacteria larger and larger quantities must be utilized with the result that the mercury compound itself, becomes a contaminant.

Similarly, copper compounds and dihydroxydiphenol are not satisfactory for similar reasons.

These slime control problems are particularly apparent with paper pulp derived from ground wood chips where the fibers are agitated with large quantities of water and formed into a slurry and where the water is removed after screening and returned to new batches of ground chips.

The composition of the wood fibers and the circulating water appears to form a particularly suitable base for the growth of slime forming micro-organisms. The slimes resulting from the growth of these bacteria and fungi tend to stay in the pulp and in many cases remain in the paper board made from the pulp and militate against the use of such paper pulp in paper milk bottles, paper frozen food containers, toilet tissues and facial tissues.

It is among the objects of the present invention to provide a novel system for reducing and eliminating slime in paper mill white water and particularly in connection with circulating water in closed paper pulp processing systems which will not result in the addition of contaminants to the circulating water and pulp and which will not involve the use of expensive mercury or copper bactericidal agents of high cost and of decreasing effectiveness against which the bactericidal agents may develop increasing resistance but which will involve only bactericidal agents having no harmful effect on the human body.

Another object is to provide an effective slime elimination procedure with resultant protection of both the pulp and circulating water in paper pulp processing systems with assurance that the resultant paper pulp and the board made therefrom will be devoid of contaminants in substantial quantity to be objectional.

Still further objects and advantages will appear in the more detailed description set forth below, it being understood, however, that this more detailed description is given by way of illustration and explanation only and not by way of limitation, since various changes therein may be made by those skilled in the art wtihout departing from the scope and spirit of the present invention.

It has been found that the above objects may be most readily accomplished by the use of sodium chlorite which when added in almost infinitesimal amounts to the circulating water eliminates the development of the slime.

This has been found quite surprising since chlorine gas itself and chlorine dioxide gas itself do not appear to be particularly effective and when utilized require addition of very large amounts out of all proportion as compared to the relatively minute quantities of sodium chlorite that may be used which will be effective over a very long period of time.

It has been found that apparently the negative $ClO_2$ ion is the effective agent since similar effects are also obtained by using potassium chlorite or lithium chlorite and less preferably calcium chlorite, none of which however are as effective as sodium chlorite in the minute quantities in which it may be used.

The amount of sodium chlorite utilized, which is in the amount of one part per million at the minimum and one hundred parts per million at the maximum, will have no deleterious effect upon the paper and paper board produced, particularly when such paper board is used for food containers or wrappers, not on the human anatomy.

It surprisingly has been found that even the finished board appears to be highly bactericidal and such bactericidal effect is transferred apparently by content to the liquid or solid food which is received in the paper board container so that such food will keep for a long period of time and will be surprisingly free of development of bacterial growth and will have no harmful biological effect.

This is all the more unusual since the number of $ClO_2$ or chlorite ions left on the paper board are almost infinitesimal in quantity and defy exact and refined chemical detection processes.

For example, bread, which is wrapped in paper in which the slime has been controlled or eliminated with the use of sodium chlorite, will prevent development of surface mold for many days and weeks longer than many ordinary packaging papers.

A similar effect is detected in connection with milk containers in which the packaged milk will develop off-flavors much more slowly even when kept at room temperatures.

It has been found important that the sodium chlorite be used in a neutral or slightly acid environment and desirably at a pH of below 7 as a pH of between 6 and 7 has been found to be most effective.

The sodium chlorite may be added either in the form of a 10 to 50 percent solution to give the proper concentration or solid material may be dissolved in small quantities in the circulating water.

For example, with a paper mill producing 80 tons of board per day, the amount of water to be treated approximates three million gallons.

It has been found the addition of 75 to 150 pounds of a 13 percent sodium chlorite solution will be most effective at a pH of 4.5 to 7 with increased effectiveness at the lower pH.

At the lower pH, the amount of chlorite may be halved or quartered to achieve the same result.

It has been found that two to four hours will result in a complete elimination of the slime forming materials.

After four hours, it has been found that there is a gradual exhaustion of the sodium chlorite so that additional quantities of chlorite should be added to bring the concentrate of the sodium chlorite up to five parts per million based upon the $ClO_2$ ions.

The slime which seems to originate from different types of micro-organisms, particularly bacteria, yeast and molds, is greatly influenced by the character of the wood and pulp supplies, the condition of the fresh water and the seasonal changes.

Spore-forming bacteria generally produce a rather tough rubbery slime, which is found in sulphite and waste-paper systems, which usually cause most difficulty in early spring and fall in paper mill processing.

Non-spore-forming bacteria also form fluffy or gelatinous type of slimes, which are very prevalent in late spring and early summer and are most frequently encountered in groundwood mills and board mills.

Yeast-like micro-organisms produce pink slimes, which are prevalent during spring, summer and fall, and are found most frequently in groundwood mills.

Molds tend to form filamented or matted, cobweb-like slime materials, which frequently cause undesirable discoloration during formation and actual degradation of the cellulose.

In addition, various types of algae, fungi and other micro-organisms are frequently encountered in the slime.

Surprisingly the treatment of the present invention eliminates substantially completely this wide variety of slime-forming materials, which cannot be readily eliminated by other types of purification, as by heating, since many of the slime-forming ingredients are resistant to heat and will retain their full activity after being subjected to heating for a long period, and others are quite resistant to various types of bactericidal or fungicidal chemicals.

In addition to the elimination of the slime, the process of the present invention also has the further advantage of eliminating those micro-organisms, and particularly fungi, which cause decomposition of pulp or cellulose materials.

While there has been herein described a preferred form of the invention, it should be understood that the same may be altered in details and in relative arrangement of parts within the scope of the appended claims.

Having now particularly described and ascertained the nature of the invention, and in what manner the same is to be performed, what is claimed is:

1. A process of controlling slime in the manufacture of paper pulp from ground wood chips where the fibers are agitated in large quantities of water and formed into a slurry and where the water is removed after screening and returned to new batches of ground chips, 80 to 100 parts of water being circulated for each part of paper pulp, the steps involving the addition to the circulating paper mill white water of between one part per million and 5 parts per million of sodium chlorite and maintaining a pH of about 4.5 to 7.

2. A process of controlling resistant slime in paper mill white water in connection with paper pulp derived from ground wood chips which the fibers are agitated with large quantities of water in the form of a slurry and such slimes are retained in the finished pulp and are highly resistant to bactericidal agents, said process involving circulating eighty to one hundred parts of water for each part of paper pulp, which comprises adding to the circulating water at a pH of between 6 and 7 about 75 to 150 pounds of a 13 percent solution of sodium chlorite per three million gallons of circulating paper mill white water.

References Cited in the file of this patent
UNITED STATES PATENTS

| | | |
|---|---|---|
| 1,737,330 | Pattillo | Nov. 26, 1929 |
| 1,788,790 | Booth | Jan. 13, 1931 |
| 2,071,091 | Taylor | Feb. 16, 1937 |
| 2,253,368 | Dubeau | Aug. 19, 1941 |

OTHER REFERENCES

Schmelkes et al.: Slime in Paper Mills, No. 327.